Oct. 10, 1967   R. S. RICHARDS   3,345,842
FLUID FILM LUBRICATION FOR EXTRUSION OF METAL
Filed Nov. 26, 1965   2 Sheets-Sheet 1
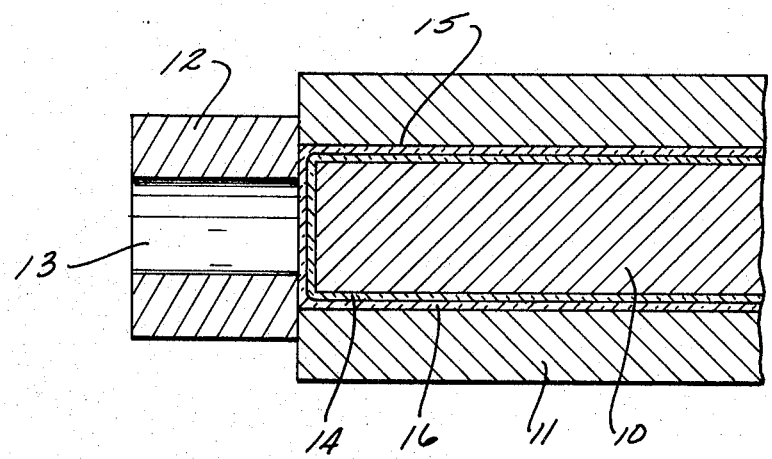
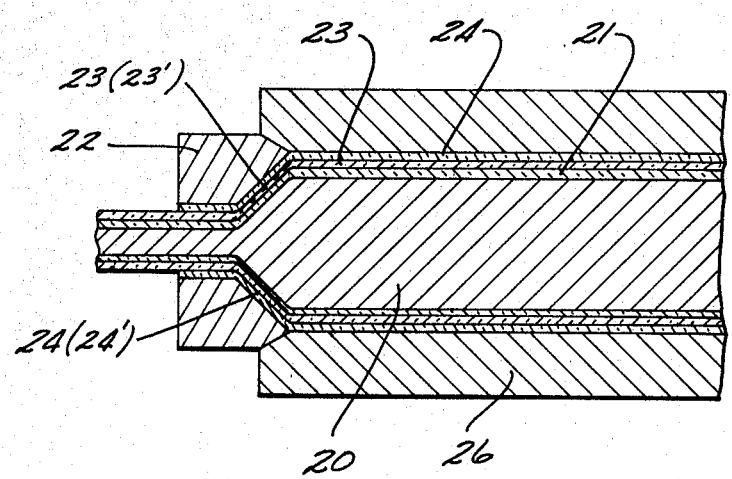
INVENTOR.
RAYMOND S. RICHARDS
BY W. A. Schaich &
Charles S. Lynch
ATTORNEYS United States Patent Office 3,345,842
Patented Oct. 10, 1967

3,345,842
FLUID FILM LUBRICATION FOR
EXTRUSION OF METAL
Raymond S. Richards, Toledo, Ohio, assignor to
Owens-Illinois, Inc., a corporation of Ohio
Filed Nov. 26, 1965, Ser. No. 509,798
14 Claims. (Cl. 72—42)

ABSTRACT OF THE DISCLOSURE

A method for providing lubrication during extrusion of metals which provides a multilayer fluid film lubricant in contact with all surfaces where friction occurs. The lubricating material is formed from a plurality of glass layers of differing viscosity-temperature characteristics and arranged in a predetermined manner. Next to the chamber wall and/or to the die wall, is the glass of relatively low fiber-softening point temperature. Any intermediate glass layers have intermediate fiber-softening point temperatures.

During the extrusion process fluid glass is in contact with the hot metal billet or workpiece surfaces as well as in contact with the extrusion chamber wall and/or the die wall, and each glass is of sufficient viscosity to enable extrusion to occur without excessive wear on the extrusion equipment and without scratching and scoring of the workpiece.

---

This application is a continuation-in-part application of my copending application Ser. No. 418,660, now abandoned, filed Dec. 16, 1964.

The present invention relates to fluid film lubrication in the extrusion of metals and alloys, and more particularly, to the lubrication of apparatus for extrusion at high temperatures of metals such as tungsten, titanium, molybdenum and alloys thereof. The novel lubrication methods of the present invention permit rapid extrusion of high temperature metals while avoiding deterioration of the dies and adverse effect on the surfaces of the extruded articles.

A number of materials have been used in the past as lubricating materials for extrusion of metals with varying degrees of success. In attempting to extrude metals or alloys, difficulties are often encountered because of the extremely high extruding temperatures and/or pressures required which result in rapid wear and deterioration of the extrusion dies. The wear on the dies is caused largely by the high temperatures and the friction occurring between the metal billet or workpiece being extruded and the extrusion chamber and die orifice.

Frequently, the extrusion of high melting point metals and alloys requires expensive repair of the dies, the extrusion chamber and other tool implements. Moreover, the surface of the extruded metal is sometimes damaged as a result of insufficient lubrication between the surface of the workpiece and die or because the die becomes ragged and uneven through excessive wear. Thus, the final extruded product may require extensive finishing operations or may be so badly damaged as to be unacceptable.

In the past, various lubricants have been employed for such purposes. However, conventional lubricants such as oil, pitch, graphite, talc and the like, either alone or mixed with other similar materials are not entirely satisfactory for purposes of extruding at high temperature and pressure.

Another method for extruding metals and alloys at high temperatures employs a layer of glass as the lubricant between the surfaces where friction occurs. The glass is generally interposed between the metal billet and the extrusion die to provide a lubricating or separating and parting material, as described in U.S. Patent 2,538,917.

In practice, however, a number of difficulties have been found to exist with such a method which have produced unsatisfactory results.

In order to obtain the most efficient lubrication in the extrusion of metal, it is necessary that the glass form a film on all surfaces where friction occurs. To illustrate, the glass functions in an optimum manner as a fluid film lubricant when it coats or wets the surfaces of the metal billet, the extrusion chamber and die surface. At the working temperatures, the glass should have sufficient flowable viscosity to permit extrusion without resorting to extreme pressures and yet not be of too low a viscosity which would permit metal-to-metal contact and destroy the effect of the lubricant. Because certain metals require extremely high temperatures and pressures for extrusion, it is difficult to obtain a glass composition that possesses all of the desired properties that constitute a good film lubricant. For example, molybdenum requires temperatures in excess of 2000° F. while tungsten requires temperatures as high as 3000° F. or more. Therefore, the glass lubricant in contact with the metal workpiece at these high temperatures is required to have adequate viscosity at 3000° F. or above so that a continuous film of glass will coat the billet or workpiece during the operation. However, glasses that are molten and of sufficient viscosity at these high temperatures will remain solid or substantially solid at relatively low temperatures; for example, at about 900° F. Hence, the aforementioned glasses are not desirable for forming a lubricating film on surfaces at relatively low temperatures. This situation usually cannot be remedied by heating the extrusion chamber and die to temperatures much in excess of 900° F. because of adverse effects on the strength characteristics of the usual metals employed. Accordingly, the glass in contact with the extrusion chamber and die must be fluid or molten and have viscosity and fluidity characteristics suitable for contact with surfaces at a temperature of about 900° F., in the example given.

Because of the nature of glasses in general, a specific glass composition that is molten and has adequate fluidity and maintains sufficient viscosity in contact with the surface of the metal billet at temperatures of 2000° F. to 3000° F. or above will be solid or rigid at 900° F. and will not function as an efficient lubricant on the surface of the extrusion chamber and die. Thus, although one surface of the glass in contact with the metal billet may perform its intended function as a fluid film lubricant, its opposite surface in contact with the extrusion chamber and die, which are at relatively low temperatures, will not function in the desired manner.

Similarly, glasses that exhibit good flow or viscosity characteristics at temperatures of about 900° F. and thus function as a good film lubricant on the surface of the extrusion chamber and die will be too fluid and almost watery at temperatures of 2000° F. to 3000° F. and thus will not function properly as a film lubricant on the surface of a hot metal billet. Low temperature glasses of insufficient viscosity permit metal-to-metal contact which markedly increases friction and produces adverse effects.

In systems used heretofore a pad of glass cloth or sintered powder is inserted between the billet and the die opening. Because the workpiece is at extremely high temperature, the surface of the glass pad in contact with the workpiece softens and becomes flowable under the pressure employed and flows through the die opening around the article being extruded. At the same time, the opposite surface of the glass pad in contact with the die which is at relatively low temperature tends to remain substantially solid and provides no lubrication action. Thus, when using a glass composition for purposes of lubrication under these conditions, the glass adjacent the hot metal surface of the billet or workpiece will soften and flow so as to function as a fluid film lubricant; however, the glass adjacent the extrusion chamber and die will remain substantially non-flowable or rigid and will not function as a film lubricant in an efficient manner. Hence, in the course of extrusion, solid glass particles will rub or abrade against the extrusion apparatus; e.g., die orifice, causing severe scratching, wear and scoring on the surfaces of the extrusion apparatus. The die is often severely scratched and even torn away and, as a result, the surface of the extruded metal article may also be roughened and torn.

Other methods have been devised where, in addition to the glass pad between the die and the billet, another lubricating material is employed in the extrusion chamber surrounding the billet. In these methods as shown in U.S. Patents 2,893,554 and 3,061,093, a glass or a salt or other similar lubricant material is applied to the metal billet prior to the extrusion thereof. The glass film is intended to soften or become fluid at high temperature to perform some of the functions of a film lubricant in the extrusion chamber itself between the surface of the billet or workpiece and the chamber walls.

However, the latter methods are different for the same reasons as previously stated. For example, in the extrusion cylinder the thickness of the glass lubricant can be approximately twenty-thousandths of one inch and it is conceivable that a temperature gradient of 2000° F. exists over this distance. The temperature of the billet is generally relatively high; e.g. 2000° F. to 3000° F., and the wall and surfaces of the extrusion chamber and die are at a temperature of about 900° F. or less. Under these conditions a glass which is molten or fluid and of sufficient viscosity at 2000° F. to 3000° F. will remain substantially solid at temperatures of 900° F. or less. Therefore, the glass film adjacent the metal billet will function as a lubricant, but the opposite surface of the glass in contact with the extrusion chamber or cylinder walls and die will be solid and will cause scratching and the deleterious effects referred to above. Scratching and abrasive action of the glass is believed to be due to the fact that the solid glass adjacent the extrusion chamber walls is dragged down the extrusion chamber and forced through the die orifice. The extreme abrasion results in tearing and excessive wear on the die orifice. Observations in practice of these methods can be best described as being similar to that obtained when attempting to extrude gravel.

The concept of a fluid film lubricant is best described in terms of a fluid which prevents contact between two surfaces and accommodates relative motion between the two surfaces by shearing action in the lubricating material. In order for the theoretical ideal conditions to be approached as closely as possible it is essential for the lubricant to completely wet and coat both surfaces with which the lubricant is in contact. Since the object is to reduce the straining force to a minimum, the shear strength of the lubricant should be low. In order for this requirement to be met, it is essential that the lubricant in contact with both surfaces be in the fluid state. Heretofore, as explained above, glasses that provide a satisfactory fluid film at high temperature in contact with the surface of the hot billet, remain solid on the opposite surface in contact with the extrusion chamber and die orifice. In addition to the requirement of adequate fluidity, the lubricant must also be of sufficient viscosity to prevent the fluid glass from being pushed aside under the high pressures employed in extrusion and prevent metal-to-metal contact, for under ideal conditions the billet should never touch the extrusion chamber walls. Thus, the viscosity of the glass must be low enough to flow as a film under the extrusion temperature and pressure conditions, yet still high enough to prevent metal-to-metal contact.

Accordingly, it is an object of the present invention to provide an improved method for extruding metals and metal alloys at high temperatures and pressures.

It is a further object of the present invention to provide a method for extruding metals and alloys employing a fluid film lubricant whereby the excessive wear and abrasion of the extrusion chamber and die orifice are materially reduced.

It is a further object of the present invention to provide a method for lubricating extrusion apparatus employing glass as the fluid film lubricating material.

It is a further object of the present invention to provide a method for extruding metal articles employing a lubricant material that will function as a good fluid film lubricant on all surfaces with which it is in contact during the extrusion process.

In attaining the above objects, one feature of the present invention resides in utilizing a fluid film lubricant in a metal extrusion process, which lubricant is in contact with all surfaces where friction occurs and which lubricant is formed from a plurality of discrete, superimposed layers of glass of differing viscosity-temperature characteristics. The glass in contact with the hot metal billet or workpiece surfaces and the glass in contact with the extrusion chamber and with the die orifice surfaces are in a fluid state and are of sufficient viscosity during the extrusion step, to enable rapid extrusion to occur without excessive wear on the extrusion equipment, and without scratching and scoring the workpiece.

Another feature of the present invention resides in utilizing a lubricant comprising three or more discrete layers of fluid glasses whereby the surfaces of the workpiece and extrusion chamber and orifice are completely wetted and coated with fluid glass and wherein the shearing action preferably takes place in the glass lubricant, thereby preventing excessive scratching and wearing of the extrusion chamber and orifice and also preventing deleterious scratches on the workpiece.

The above objects, features and advantages of the present invention as well as other objects, features and advantages of the invention will become more apparent from the following detailed description thereof taken in conjunction with the drawings wherein:

FIG. 1 shows a partial longitudinal cross-sectional view through an extrusion chamber showing the die orifice for extruding a solid metal billet or workpiece and the fluid film lubricant of the present invention;

FIG. 2 is an enlarged longitudinal cross-sectional view of an extrusion chamber and die illustrating schematically and not to scale the manner in which the lubricants of the present invention function during extrusion as a fluid film to wet the workpiece surfaces and the surfaces of the extrusion apparatus;

Figure 3:
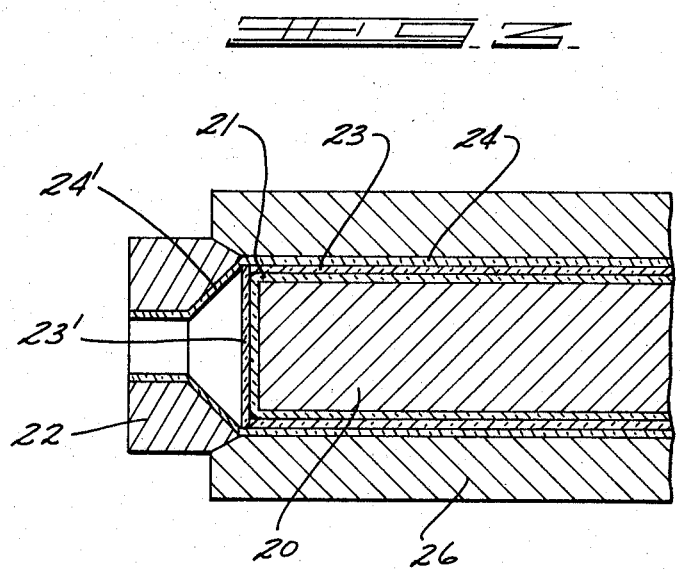
FIG. 3 and FIG. 4 are longitudinal cross-sectional views of the apparatus of FIGURE 2 showing location of glass lubricants prior to extrusion.

For convenience, the terms "melting point" or "melting temperature" are used in the present specification when discussing the glasses employed in this invention. Such terms are used in the layman's sense, however, merely to indicate that the relationship between the glasses of the lubricant films is one where one glass changes from an essentially rigid solid to a fluid or semi-fluid material at a lower temperature than the other glass. As is well understood by those skilled in the art to which the present invention relates, glass does not, technically speaking, melt or have a melting point. Glass is in a metastable rigid or "frozen" state, and has been described as an amorphous material having an infinite viscosity. Thus, while no glass melts or has, strictly speaking, a melting point, glass varies in the degree of "hardness" so that two glasses of their melts can have different viscosities at the same temperature. The glass with the highest viscosity at a given temperature or with the highest softening temperature is spoken of as a relatively "hard" glass. A convenient temperature which can be referred to instead of melting point is the technically correct term "fiber softening point." As is well known, the fiber softening point is determined by ASTM C224–56. At the fiber softening point temperature the logarithm of the viscosity of the glass is approximately 7.65. Thus, while the presentation and explanation of the invention is largely described in terms of the easily grasped concept of melting point, it will be understood that the glass spoken of as having the lowest melting point is actually the glass having the lowest fiber softening point temperature and the glass spoken of as having the highest melting point is the glass which has the highest fiber softening point temperature. In the interest of greater precision, the claims appended hereto are expressed in terms of fiber softening points instead of melting points.

Referring more particularly to the accompanying drawings, in FIGURE 1 a metal billet or workpiece 10 is placed in an extrusion chamber 11 formed of a suitable metal material and a die 12 is positioned at one end of the extrusion chamber. The die 12 is provided with a die opening or orifice 13 through which the metal billet is extruded by pressure applied to the metal billet by suitable means known in the art and thus not shown in the drawings.

Billet 10 is completely coated with a high melting temperature glass 14 which can be applied to the hot billet in any form such as a frit, powder, and the like, and preferably applied by dipping the hot billet into a tank containing the glass. The glass frit or glass powder upon contacting the surfaces of the hot billet forms a fluid that wets and coats the surface of the billet, prior to the coated billet being placed into the extrusion chamber 11. The extrusion chamber walls 15 and die orifice are coated with a relatively low melting point glass 16 which, under extrusion conditions is molten or fluid and has adequate viscosity so that it completely wets and coats the surface of the extrusion chamber wall and die opening surface during extrusion.

In carrying out the extrusion, the coated metal workpiece 10 is heated to the extrusion temperature if not already sufficiently hot and is extruded through the die 12 by the application of pressure (such as by a ram, not shown) at the opposite end of the workpiece. During the extrusion the glass coatings 14 and 16 are in a molten and thus fluid condition. Under ideal conditions, the shearing takes place at the interface of the two glass film lubricants thereby permitting rapid extrusion of the metal without excessive wear and abrasion taking place on the extrusion chamber walls and die opening surfaces and without scratching or damaging the surface of the workpiece.

In the preferred embodiment of the present invention three or more discrete layers of glass film lubricants are utilized. A glass of relatively high melting point is in contact with the surface of a metal billet, a glass of relatively low melting point is in contact with the surface of the extrusion chamber and internal die walls and at least one glass of intermediate melting point is interposed between the glass of high melting point and the glass of low melting point.

FIG. 2 shows a preferred embodiment of the present invention wherein workpiece 20, coated with glass lubricant 21 is extruded through die 22. Intermediate glass fluid film lubricant 23 and low temperature glass lubricant 24 flow through the die orifice 22 so as to enable smooth extrusion at a rate which maintains the three glasses in the molten state and which permits complete wetting and coating of the die orifice as well as complete wetting and coating of the surface of the metal billet. In this manner, metal-to-metal contact is avoided and the shearing action ideally takes place in the intermediate melting point glass.

FIG. 3 shows one arrangement prior to extrusion for assuring the presence of plural films of glass during the extrusion process such as depicted in FIGURE 2. The interior wall of extrusion chamber 26 is coated with a low melting glass layer 24, and the internal walls of the die 22 are coated with a low melting glass 24'. Metal billet 20 is coated with a high melting glass layer 21. Before insertion of the coated billet in the extruder chamber 26, a second glass layer is applied over layer 24. This layer is of a melting point intermediate the melting points of layers 24 and 21. Billet 20 is heated to extrusion temperature before coating, and the hot coated billet with its film of molten glass is inserted in chamber 26. Usually chamber 26 and die 22 are preheated before coating and the glass of the coating 24 and 24' become molten from the heat of this apparatus. If desired, the sprayed powdered frit of layer 23 can be heated to a molten condition by a flame or other radiant heating means, or this melting can be left to the heat picked up from the billet after its insertion.

Before laying down coating 23 a plate glass 23' is inserted across the end of the chamber 26 at about its juncture with the die 22. This glass is of a melting point intermediate glass layers 24' and 21. The hot metal billet, nearly in place as shown, radiantly heats the glass of plate 23' to a molten condition prior to extrusion so that solid chunks or fragments of glass are not present during extrusion to scratch the walls of chamber 26 or of die 22 or to score the billet being extruded. Die 22 can be heated by suitable means before extrusion, and if the glass layer 23 is not heated to a molten condition before extrusion by radiant heat from billet 20, film 23 can also be heated to a molten condition, as by application of a flame.

A very simple (and often preferred) method to provide the three glass layers as shown in FIGURE 2, is to dip or roll billet 20 in glass for layer 21, spray the preheated chamber 26 inner walls and the die 22 inner walls with powdered glass to form molten layer 24 (or 24'). If another layer is used, it can be sprayed in powder form on 24 (and 24' if a different composition was used next to the die). This second layer in the chamber and die can be preheated to a molten condition by means of radiant heat, as from a flame or from a highly heated dummy metal block inserted in the chamber and the die opening without physically contacting the layers 24, 24' therewith. Thereafter, the coated billet can be inserted and extruded through the die as shown in FIGURE 2.

In accordance with the present invention there are, during extrusion, films of at least two fluid glasses maintained between the billet and the extruder and also between the billet and the die walls, the glasses being of progressively lower melting point going away from the billet or workpiece. However, the glass layer coating the die walls need not be the same as the glass coating the extruder chamber walls. Further, the intermediate glass layer, if any, need not be the same in the extruder as in the die. For instance, while 24' may be the same glass as 24 in FIGURE 3 and 23' may be the same glass, this need not be the case. In some instances the die wall is made of a very low heat transfer refractory such as zirconium oxide and it thus runs much hotter during extrusion than the metal extruder wall. If desired, therefore, layer 24' can be higher melting than layer 24. Also, layer 23' can be higher melting than layer 23.

It is also within the purview of the invention to maintain fewer effective fluid glass layers in die 22 than in the extruder 26. For instance, if the die walls run much hotter than the extruder walls, as few as two layers may be adequate in the die, while the temperature spread between the billet or workpiece in the extruder chamber may require the presence of three or more layers of molten glass, keeping in mind that the object is to maintain fluid glass at all points between the billet or workpiece and the surrounding walls, which fluid glass contains no solid fragments that can score the walls or the workpiece. In such an instance, referring to FIGURE 3, layer 24' can be higher melting than 23 and plate 23' can be omitted or layer 24' can be omitted initially and plate 23' can be of a higher melting glass than layer 24, even of the same melting point as layer 23, and in any event intermediate the melting point of 24 and 21.

It is further within the purview of the invention to have more layers of glass in the die than between the billet and the chamber wall, especially when the interior die wall is not made of a low heat transfer material and thus also runs relatively cool as does the extruder chamber wall. The die is subjected to far higher pressures and is subjected to more abuse. In such instance, for example, more fluid glass layers can be present in the die than in the extruder chamber during extrusion. For instance, the layer 23 in FIGURE 3 could be omitted.

Since in an extrusion process the finished shape is made in the die, and since the die is usually expensive and subject to great wear, it is also within the scope of the invention to have interposed between the die and the billet or workpiece, two or three or more layers of molten or fluid glass, regardless of whether or not there are one or more lubricant layers of glass or other material between the billet and the extrusion chamber, and even regardless of whether there is any extrusion chamber at all.

Figure 4:
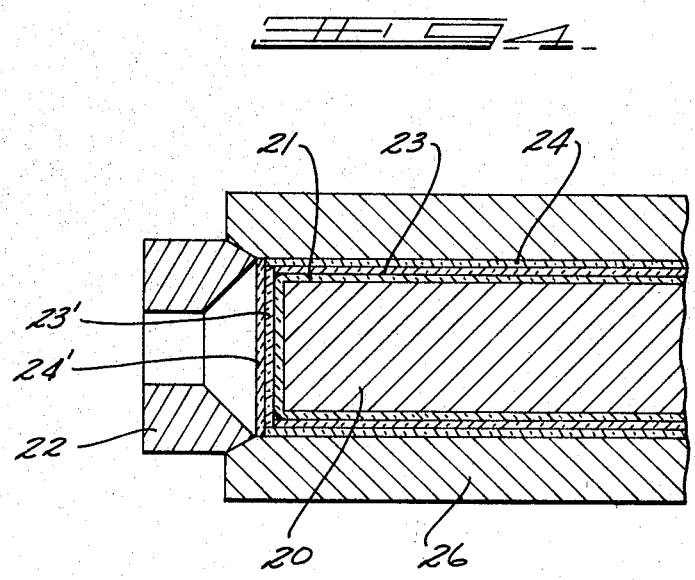

FIGURE 4 is similar to FIGURE 3 but employs a second glass plate 24' which in operation lays down a layer 24' next to the die wall. Other reference numbers are of the same description as before.

The glass of relatively high melting temperature (or of high fiber softening point) can be chosen to be of sufficient fluidity and viscosity at high temperature so that it can be used for the extrusion of materials including titanium which is extruded at a temperature of 1800° F., high temperature steel which is extruded at temperatures of about 2100° F., molybdenum which is extruded at temperatures of 2300° F. and tungsten which is extruded at temperatures of about 3000° F. The particular glass selected for the high temperature glass will depend on what metal or alloy is being extruded; i.e., the selection of the high temperature glass will depend on the temperature of the workpiece.

It is to be understood that the choice of the specific glass utilized for this purpose will vary as will be apparent to those skilled in the art. The important factor influencing the choice is the relative melting point of the glass so that a fluid film will be in contact with all surfaces where friction occurs.

The glasses of intermediate melting temperature can be selected from a considerable number of compositions. The specific intermediate glass chosen is not a critical feature of the invention. In those instances where the extrusion is carried out at extremely high temperatures such as 3000° F.; i.e. when extruding tungsten, a high temperature glass is chosen which has a sufficient viscosity at a temperature of about 3000° F., the intermediate glass can then be chosen, for example to have a sufficient viscosity at a temperature of about 2000° F. In like manner where the metal is extruded at about 2100° F.; i.e. high temperature steel, then the high temperature glass is chosen to have a sufficient viscosity at a temperature of about 2100° F. and the intermediate glass may be chosen to have a sufficient viscosity at a temperature of about 1500–1300° F., for example.

As will be apparent from the foregoing, a given glass with a melting temperature of about 2000–2100° F., for example, in the case of steel, functions as the high temperature glass, whereas when tungsten is extruded, the same glass may be chosen as the intermediate glass. Thus, there is no specific classification for individual glass. Whether any given glass is a high temperature or intermediate glass will depend on what metal is extruded and its extrusion temperature.

The following are examples of various glasses that are suitable for the purposes of the present invention and can function as high temperature glass and, in certain cases, can also function as intermediate glasses depending on the temperature of the metal being extruded. In the table the temperature values are given at log 2 viscosity; i.e. the viscosity is the same for all the glasses at the temperatures stated.

TABLE I

| Composition | Parts by Weight | Temperature at Log 2 Viscosity, ° F. |
|---|---|---|
| $SiO_2$ | 59.96 | 2,190 |
| $Al_2O_3$ | 1.30 | |
| Dolomite | 16.54 | |
| Soda | 22.000 | |
| $SiO_2$ | 61.6 | 2,815 |
| $Al_2O_3$ | 18.6 | |
| CaO | 12.9 | |
| MgO | 7.2 | |
| $SiO_2$ | 72.5 | 3,060 |
| $Al_2O_3$ | .8 | |
| $B_2O_3$ | 16.3 | |
| Soda | 3.9 | |
| $K_2O$ | .1 | |
| CaO | .1 | |
| PbO | 5.9 | |
| $SiO_2$ | 71.66 | 2,670 |
| $Al_2O_3$ | 1.95 | |
| $Fe_2O_3$ | .087 | |
| CaO | 10.28 | |
| MgO | 4.30 | |
| $Na_2O$ | 11.36 | |
| $K_2O$ | .41 | |
| $SiO_2$ | 67.6 | 2,800 |
| $Al_2O_3$ | 1 | |
| $Na_2O$ | 4.7 | |
| $K_2O$ | 10.6 | |
| CaO | .2 | |
| BaO | 4.2 | |
| PbO | 11.7 | |
| $SiO_2$ | 74.84 | (3,250) |
| $B_2O_3$ | 11.6 | |
| $Al_2O$ | 4.49 | |
| CaO | 0.26 | |
| MgO | .06 | |
| $Na_2O$ | 6.0 | |
| BaO | 2.52 | |
| $SiO_2$ | 80.6 | |
| $B_2O_3$ | 12.0 | |
| $Na_2O$ | 4.1 | |
| $Al_2O_3$ | 2.2 | |
| $SiO_2$ | 71.42 | 2,580 |
| $Al_2O_3$ | 1.83 | |
| $Fe_2O_3$ | 0.203 | |
| CaO | 10.30 | |
| MgO | 0.22 | |
| $T_2O$ | 0.22 | |
| $Na_2O$ | 15.45 | |
| $Cr_2O_3$ | 0.204 | |
| PbO | 70 | 1,055 |
| $B_2O_3$ | 15 | |
| ZnO | 9 | |
| BaO | 2 | |
| CuO | 2 | |
| $SiO_2$ | 2 | |
| PbO | 80.2 | 720 |
| $B_2O_3$ | 17.1 | |
| ZnO | 2.7 | |
| PbO | 39.4 | 2,070 |
| $Na_2O$ | 14.0 | |
| $R_2O_3$ | .1 | |
| $SiO_2$ | 46.0 | |
| PbO | 19.3 | 2,355 |
| CaO | 5.9 | |
| MgO | 4.1 | |
| $Na_2O$ | 12.0 | |
| $R_2O_3$ | .1 | |
| $SiO_2$ | 58.2 | |
| $Na_2B_4O_7$ | | 1,346 |
| $B_2O_3$ | | 1,832 |

Further information regarding viscosity is found in Morey; The Properties of Glass, Reinhold Pub. Corp., 1954, chapter V.

The surface temperature of the extrusion chamber wall is generally about 900° F. and less, probably most likely to be around 800° at which temperature the glass of high melting point is extremely brittle and would severely scratch and deleteriously abrade the surfaces in contact therewith. The low temperature glass used to coat the surface of the extrusion chamber are glasses of relatively low melting point (or low fiber softening point). These glasses would be unsuitable for use as the sole lubricating agent because they become too fluid at high temperatures. However, the low temperature melting glasses are extremely well suited for wetting and coating of the surface of the extrusion chamber and orifice at 900° F. or less. Various examples of low temperature glass compositions are listed below:

TABLE II

| Composition | $V_2O_5$ | $P_2O_5$ | PbO | $Ag_2O$ | $K_2O$ | $Tl_2O_5$ | Deform. Temp., °C. |
|---|---|---|---|---|---|---|---|
| 1 | 75.74 | 24.26 | | | | | 300 |
| 2 | 64.55 | 35.45 | | | | | 330 |
| 3 | 36.52 | 23.40 | 14.88 | 25.21 | | | 255 |
| 4 | 33.18 | 21.26 | 13.52 | | 32.04 | | 250 |
| 5 | 33.10 | 21.21 | | 46.59 | | | 245 |
| 6 | 27.14 | 23.19 | 18.44 | 31.23 | | | |
| 7 | 28.18 | 24.08 | 15.31 | 32.42 | | | |
| 8 | 21.11 | 18.89 | | 30.53 | 28.47 | | |
| 9 | 24.09 | 20.58 | 6.54 | 33.26 | 15.51 | | |
| 10 | 18.45 | 35.45 | | 38.20 | | 7.90 | |
| 11 | 27.40 | 23.41 | 7.44 | 37.84 | | 3.90 | |

The following examples are for purposes of illustrating the present invention and are not to be considered as limiting the scope thereof in any manner.

Example I

In this test, a low melting glass, namely, hydrated boron trioxide, was applied in the form of a frit in an inert organic binder to the extrusion cylinder wall and die. A glass having the following composition in weight percentage:

PbO _____ 80.2
$B_2O_3$ _____ 17.1
ZnO _____ 2.7 and having a temperature of 720° F. at log 2 viscosity, was then applied over the low melting glass on the surfaces of the die only. It had a fiber softening point intermediate the glass softening point of the other two glasses of this example. The high melting glass of the following composition in weight percentage:

$SiO_2$ _____ 61.3
$Al_2O_3$ _____ 18.6
CaO _____ 12.9
MgO _____ 7.2 and having a temperature of 2815° F. at log 2 viscosity, was applied to a molybdenum billet which had been heated to a temperature of approximately 1900° F. The billet was inserted into the extrusion chamber and was extruded rapidly. At the preheated temperature of the cylinder and die, the low melting temperature glass was melted and completely wetted the cylinder wall. After extrusion the die and extruded article were examined and found to be completely coated and wetted with the glasses. The coating of the glass on the die and the extrusion indicated that the shear had occurred in the glass lubricant thereby approaching the ideal conditions. After the ingot was completely extruded the die orifice was inspected and was found to be free from scratches.

Example II

A molybdenum billet 2½" wide x 8" long was extruded by the following procedure. The extrusion cylinder wall and the die wall were first coated with a $B_2O_3$ frit, and a second coat of a glass of an intermediate melting point having the following composition in weight percent, was applied thereto:

PbO _____ 70
$B_2O_3$ _____ 15
ZnO _____ 9
BaO _____ 2
CaO _____ 2
$SiO_2$ _____ 2

It will be apparent from the foregoing that the above is a glass having an intermediate melting point (fiber softening point) for purposes of this example.

At a temperature of 1055° F. the log viscosity of the second glass was 2. The molybdenum billet was coated with glass of the following composition in weight percent:

$SiO_2$ _____ 61.3
$Al_2O_3$ _____ 18.6
CaO _____ 12.9
MgO _____ 7.2

Temperature at log 2 viscosity for the above glass is 2815° F. The high temperature glass was applied to the billet by dipping the hot billet into a basket containing glass frit until its surfaces were completely covered. The molybdenum was rapidly extruded at a temperature of about 2300° F. to form a good product with no severe scratching or deleterious effects being visible in the extrusion chamber, or the die, and no scratches appearing on the extruded product.

The various glasses can be applied to the billet surface, and to the surfaces of the extrusion apparatus in any convenient manner, as indicated hereinbefore.

Glasses set forth in the foregoing examples and tables are merely representative of those that can be utilized according to the teachings of the present invention.

Various extruded articles can be made following the teachings of the present invention including solid rods and hollow pipes. Moreover, the present invention can be used with any suitable extruding apparatus and with any metals or alloys, not being limited to high temperature extrusion. All types of metals and alloys can be extruded according to the methods described above and it is understood that the term "metal" as used herein is intended to include metal alloys as well.

Although the foregoing description and examples emphasize the two- or three-component lubricant of the present invention it is understood that one or more intermediate glasses can be used and that the viscosity of the intermediate glass can be adjusted as desired so as to achieve the most suitable viscosity which will be fluid enough to maintain good shearing action in the glass and yet not too viscous so that the extrusion process is thereby slowed down. Furthermore, the intermediate glass can be omitted where the high and low temperature glasses are sufficient for producing good fluid films for lubrication.

What is claimed is:
1. In a method wherein a metal billet or workpiece is extruded from an extrusion chamber and through a die positioned at an end of said chamber while the billet is at a higher temperature than the extrusion chamber wall and the die wall, the improvement which comprises having interposed between said billet and said chamber walls and between said billet and said die walls, during the extrusion process, a plurality of contiguous layers of glass having different viscosity characteristics, the glass of the layer next to and in contact with said billet having the highest fiber softening point, and succeeding layers of glass having progressively lower fiber softening points, each layer of glass being molten and of a viscosity effective to wet and coat the surfaces in contact therewith during extrusion of said billet, whereby the force required to accomplish said extrusion is less than in the absence of said layer of molten glass.

2. The improvement of claim 1 where the plurality of contiguous succeeding layers of glass are two in number between said billet and said chamber walls and between said billet and said die walls.

3. The improvement of claim 1 where the plurality of contiguous succeeding layers of glass are at least three in number between said billet and said chamber walls and between said billet and said die walls.

4. The improvement of claim 1 wherein there are at least three contiguous succeeding layers of glass between said extrusion chamber walls and said billet.

5. The improvement of claim 1 wherein there are at least three contiguous succeeding layers of glass between said die walls and said billet.

6. In a method wherein a metal workpiece is extruded at high temperature from an extrusion chamber through a die positioned at one end thereof, the improvement which comprises coating the hot metal workpiece prior to extrusion with a layer of a first glass of relatively high fiber softening point temperature which remains fluid at a temperature equivalent to the surface temperature of the metal workpiece during extrusion, coating the surface of the extrusion chamber and die with a layer of a second glass of relatively low fiber softening point temperature which remains fluid at a temperature equivalent to the surface temperature of the extrusion chamber and die, and applying at least one other layer over the layer of said second glass of a third glass of intermediate fiber softening point temperature that remains fluid at a temperature intermediate the temperature of the surfaces of the metal billet and the extrusion chamber and of the metal billet and the die, said fluid glass layers being of sufficient viscosity at their respective temperatures during extrusion to coat the workpiece, the chamber and the die, thus providing lubrication aiding said extrusion process while minimizing wear on said chamber and die and minimizing scoring of said workpiece.

7. In the method of extruding a metal billet or workpiece through an extrusion chamber having a die through which the billet is extruded at high temperatures, the improvement which comprises coating the billet with a glass having a relatively high fiber softening point, and coating the extrusion chamber and die walls with a glass having a relatively low fiber softening point, said glasses being fluid and of a viscosity effective to wet the surfaces of said billet, extrusion chamber walls and die walls during the extrusion of the metal billet, whereby improved extrusion of the metal through the die is provided.

8. In a method wherein a heated metal billet is extruded from an extrusion chamber having a die positioned at one end thereof, the improvement which comprises coating the metal billet prior to extrusion with a glass having a relatively high fiber softening point, coating the die and extrusion chamber with a glass having a relatively low fiber softening point and then applying to the coated die and extrusion chamber a coating of a glass having an intermediate fiber softening point, and forcing the billet through the die, said glasses being of a viscosity effective to wet and coat the surfaces in contact therewith during the extrusion, whereby improved lubrication is obtained.

9. In a method of extruding a metal billet from an extrusion chamber having a die at one end, the improvement whereby a plurality of discrete layers of entirely molten or fluid glass are interposed between the metal billet and the die walls, the glass layer immediately adjacent to and in contact with the die walls being a glass of relatively low fiber softening point, the glass layer immediately adjacent and in contact with the metal billet having a relatively high fiber softening point and at least one glass layer being interposed between the glass of high fiber softening point and the glass of low fiber softening point, said glass layer interposed having an intermediate fiber softening point, said glasses being of adequate fluidity and sufficient viscosity during the extrusion of the billet so as to completely wet the surfaces of the billet and die walls with molten glass during extrusion.

10. The improvement of claim 1 wherein the metal workpiece is titanium.

11. The improvement of claim 1 wherein the metal workpiece is tungsten.

12. The improvement of claim 1 wherein the metal workpiece is molybdenum.

13. In a method wherein a metal billet or workpiece is extruded through a die while the billet is at a higher temperature than the die wall, the improvement which comprises having interposed between said billet and said die walls, during the extrusion process, a plurality of contiguous layers of glass having different viscosity characteristics, the glass of the layer next to and in contact with said billet having the highest fiber softening point, and succeeding layers of glass having progressively lower fiber softening points, each layer of glass being molten and of a viscosity effective to wet and coat the surfaces in contact therewith during extrusion of said billet, whereby the force required to accomplish said extrusion is less than in the absence of said layer of molten glass.

14. The improvement of claim 13 wherein the plurality of contiguous succeeding layers of glass are at least three in number.

References Cited
UNITED STATES PATENTS 2,630,220  3/1953  Sejournet _____ 72—42

FOREIGN PATENTS 699,120  10/1953  Great Britain _____ 207—10.1
896,360  5/1962  Great Britain _____ 207—10.1

CHARLES W. LANHAM, *Primary Examiner.*

K. C. DECKER, *Assistant Examiner.*